(12) United States Patent
Mishima et al.

(10) Patent No.: US 11,379,692 B2
(45) Date of Patent: Jul. 5, 2022

(54) LEARNING METHOD, STORAGE MEDIUM AND IMAGE PROCESSING DEVICE

(71) Applicant: KABUSHIKI KAISHA TOSHIBA, Tokyo (JP)

(72) Inventors: Nao Mishima, Inagi Tokyo (JP); Tatsuo Kozakaya, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 323 days.

(21) Appl. No.: 16/808,586

(22) Filed: Mar. 4, 2020

(65) Prior Publication Data

US 2020/0394464 A1    Dec. 17, 2020

(30) Foreign Application Priority Data

Jun. 17, 2019    (JP) .............................. JP2019-112008

(51) Int. Cl.
| | |
|---|---|
| *G06K 9/00* | (2022.01) |
| *G06K 9/62* | (2022.01) |
| *G06F 17/18* | (2006.01) |
| *G06N 20/00* | (2019.01) |
| *G06V 10/22* | (2022.01) |
| *G06V 20/64* | (2022.01) |

(52) U.S. Cl.
CPC ........... *G06K 9/6257* (2013.01); *G06F 17/18* (2013.01); *G06K 9/6265* (2013.01); *G06N 20/00* (2019.01); *G06V 10/22* (2022.01); *G06V 20/653* (2022.01)

(58) Field of Classification Search
None
See application file for complete search history.

(56) References Cited

U.S. PATENT DOCUMENTS

| 10,951,835 B1 * | 3/2021 | Kashiwagi | ......... H04N 5/23225 |
| 11,030,760 B2 * | 6/2021 | Kashiwagi | .............. G06T 7/571 |

(Continued)

FOREIGN PATENT DOCUMENTS

| JP | 2016-102733 A | 6/2016 |
| JP | 2017-40642 A | 2/2017 |

(Continued)

OTHER PUBLICATIONS

Cristofalo et al., "Out-of-focus: learning depth from image bokeh for robotic perception" (Year: 2017).*

(Continued)

*Primary Examiner* — Soo Jin Park
(74) *Attorney, Agent, or Firm* — Finnegan, Henderson, Farabow, Garrett & Dunner L.L.P.

(57) ABSTRACT

According to one embodiment, a learning method for causing a second statistical model to learn using a first statistical model is provided. The method includes obtaining a first learning image, cutting out each local area of the obtained first learning image, and obtaining a first prediction value output from the first statistical model by inputting each local area to the first statistical model and obtaining a second prediction value output from the second statistical model by inputting the entire area of the first learning image to the second statistical model, and causing the second statistical model to learn based on a difference between the first prediction value and the second prediction value.

15 Claims, 16 Drawing Sheets

(56) References Cited

U.S. PATENT DOCUMENTS

| | | |
|---|---|---|
| 11,100,662 B2 * | 8/2021 | Mishima .................. G06T 7/571 |
| 2016/0154152 A1 | 6/2016 | Moriuchi et al. |
| 2017/0054910 A1 | 2/2017 | Moriuchi et al. |
| 2017/0353710 A1 | 12/2017 | Sasaki et al. |
| 2020/0051264 A1 | 2/2020 | Mishima et al. |

FOREIGN PATENT DOCUMENTS

| | | |
|---|---|---|
| JP | 2017-220780 A | 12/2017 |
| JP | 2020-26990 A | 2/2020 |

OTHER PUBLICATIONS

Bailer et al., "Fast Dense Feature Extraction with CNNs that have Pooling or Striding Layers," arXiv:1805.03096v1, 10 pages (May 8, 2018).

He et al., "Rethinking ImageNet Pre-training,"arX1v:1811.08883v1, 10 pages (Nov. 21, 2018).

* cited by examiner

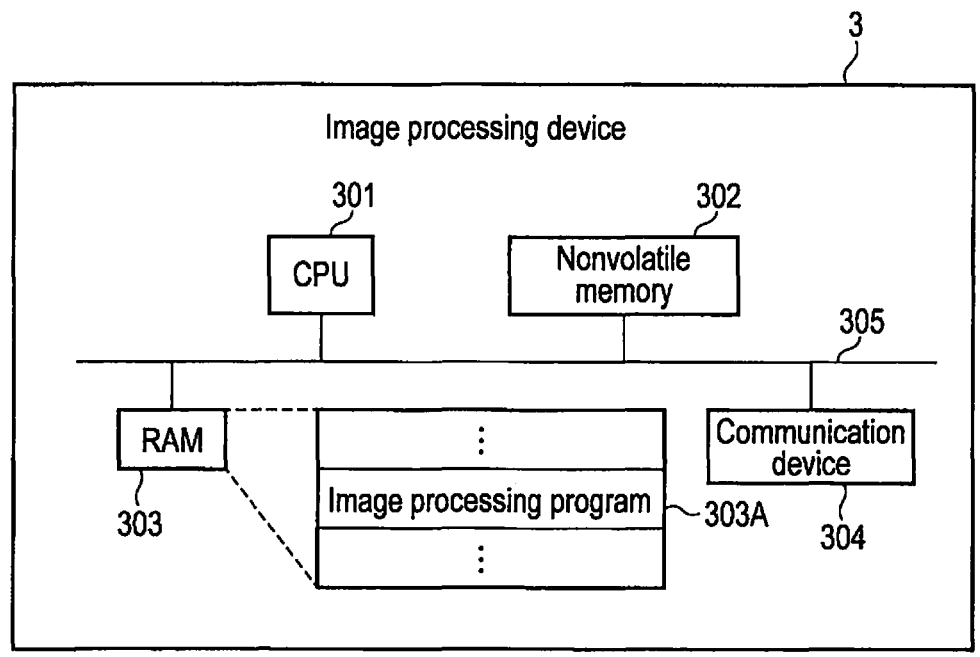
F I G. 2
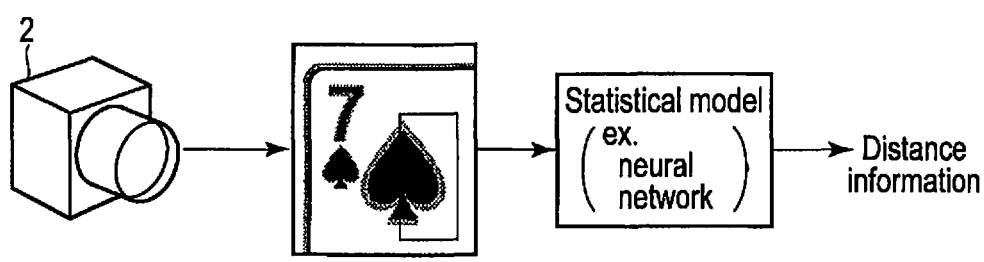
F I G. 3

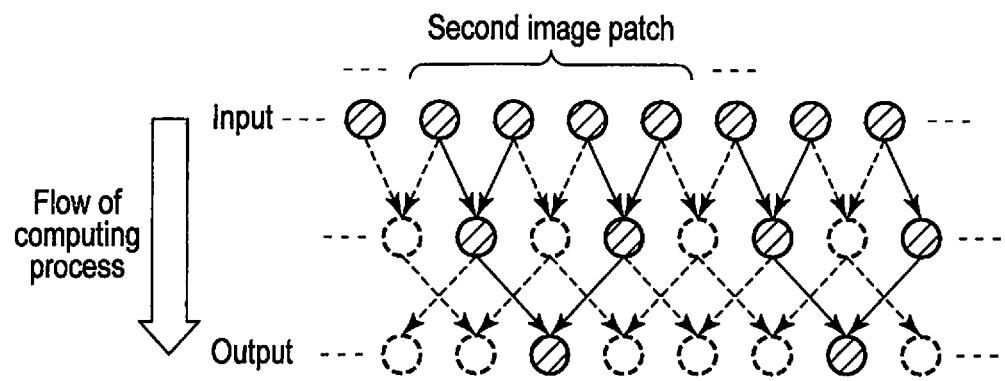
F I G. 9
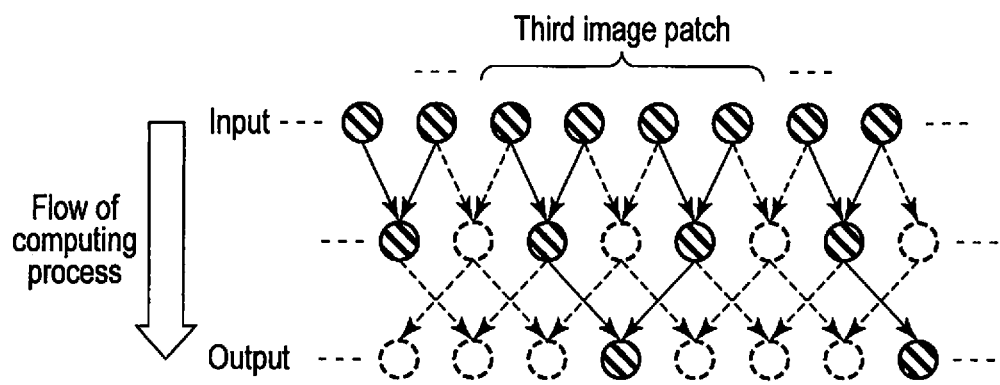
F I G. 10

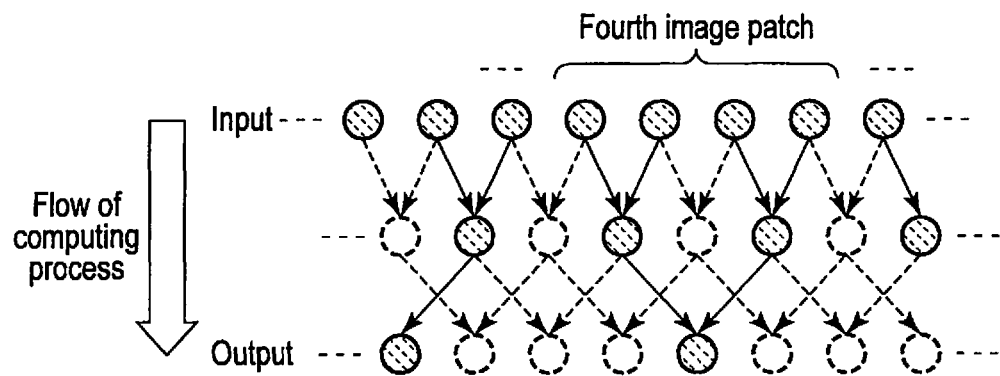
F I G. 11
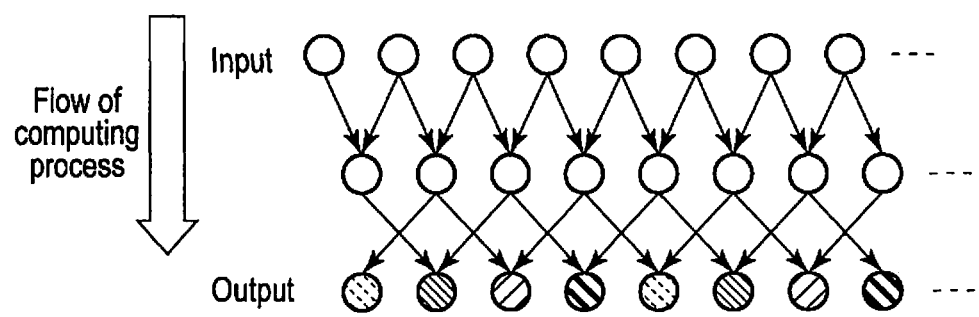
F I G. 12

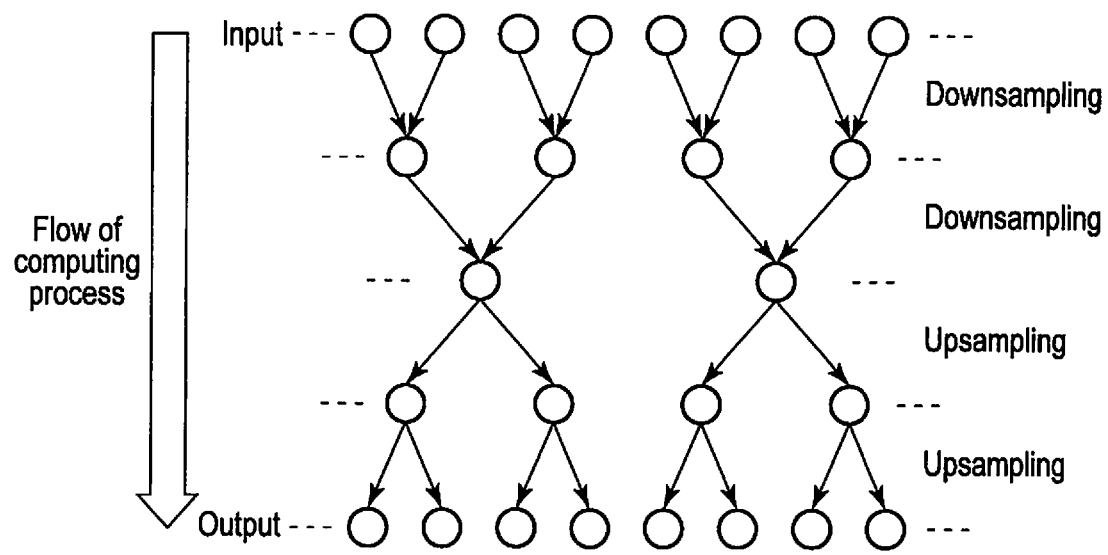
F I G. 13
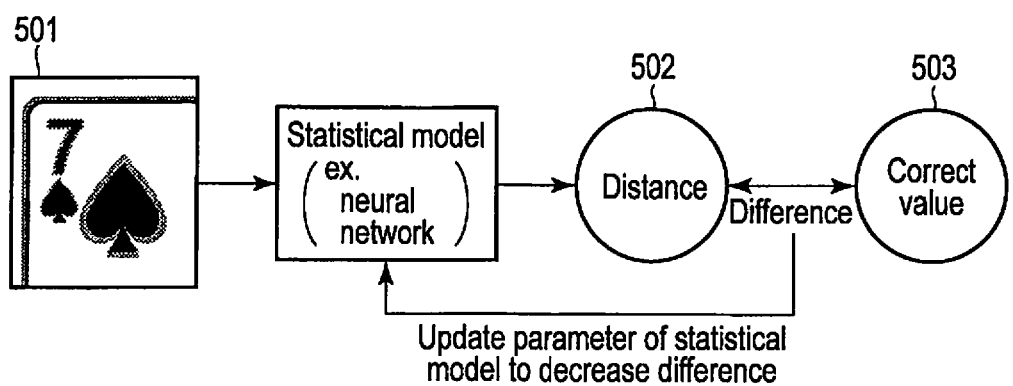
F I G. 14

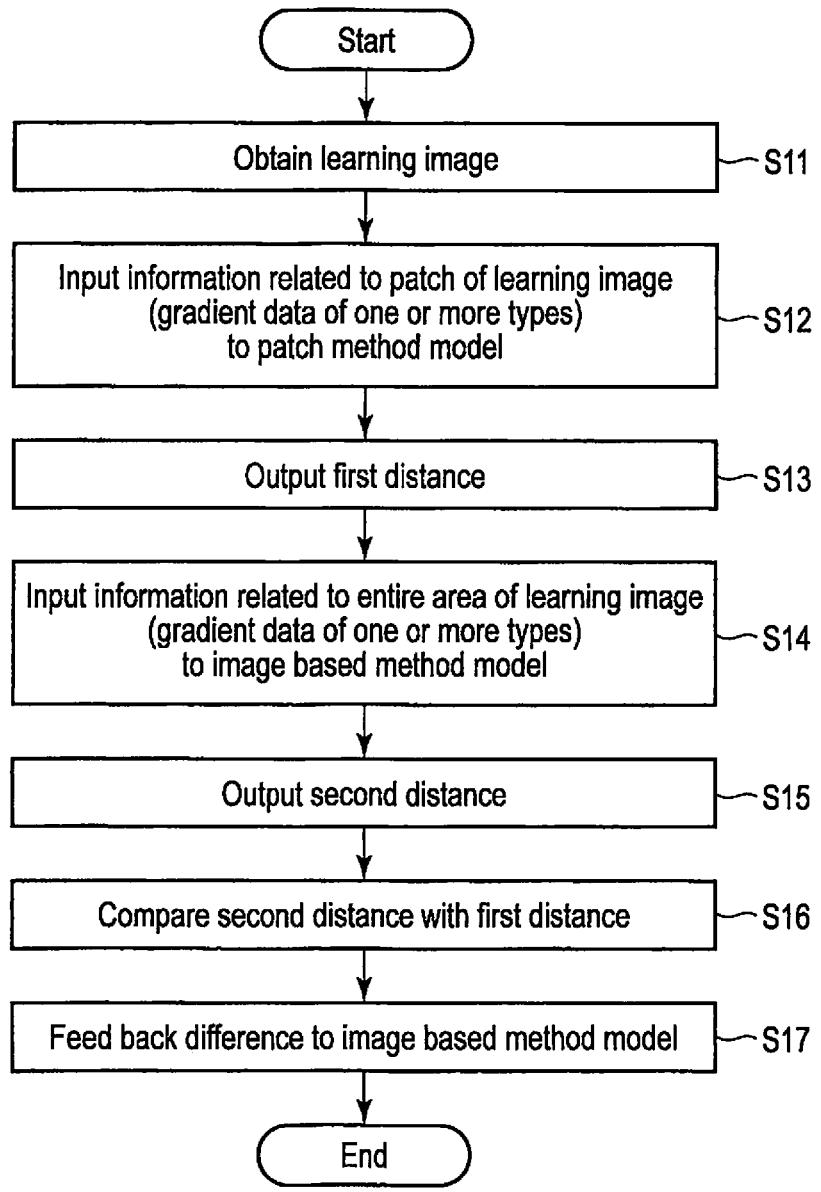
F I G. 17

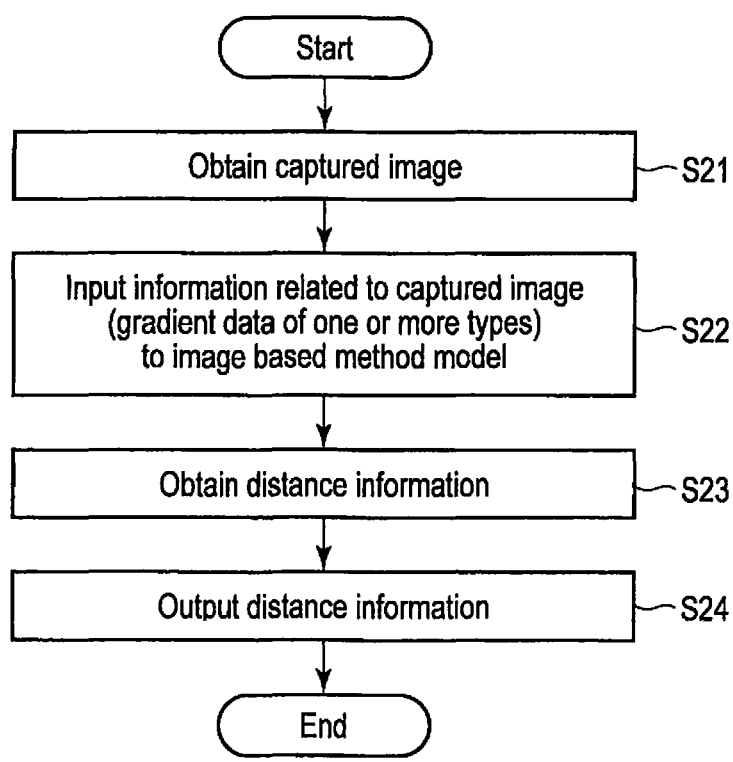
F I G. 18

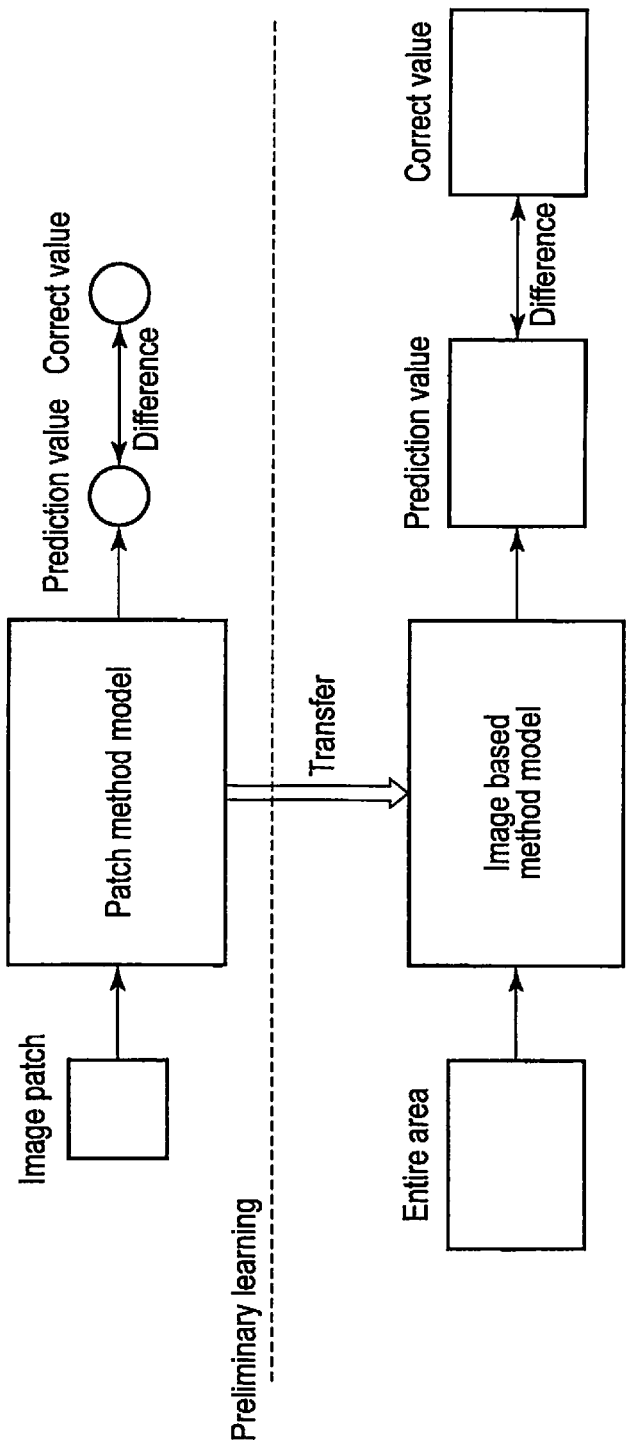
F I G. 19

LEARNING METHOD, STORAGE MEDIUM AND IMAGE PROCESSING DEVICE

CROSS-REFERENCE TO RELATED APPLICATIONS

This application is based upon and claims the benefit of priority from Japanese Patent Application No. 2019-112008, filed Jun. 17, 2019, the entire contents of which are incorporated herein by reference.

FIELD

Embodiments described herein relate generally to a learning method, a storage medium and an image processing device.

BACKGROUND

To obtain the distance to a subject, the use of images captured by two capture devices (cameras) or a stereo camera (compound-eye camera) has been known. In recent years, a technology for obtaining the distance to a subject using images captured by a single capture device (monocular camera) has been developed.

To obtain the distance to a subject using images as described above, a statistical model generated by applying a machine learning algorithm such as a neural network may be used.

To generate a high-accuracy statistical model, a massive amount of data set for learning (a set including a learning image and a correct value related to the distance to a subject in the learning image) needs to be learned by the statistical model. However, it is not easy to prepare the data set.

BRIEF DESCRIPTION OF THE DRAWINGS

FIG. 2 shows an example of the system configuration of an image processing device.
FIG. 3 is shown for explaining the outline of the operation of the ranging system.
FIG. 9 schematically shows the flow of the computing process of the patch method.
FIG. 10 schematically shows the flow of the computing process of the patch method.
FIG. 11 schematically shows the flow of the computing process of the patch method.
FIG. 12 schematically shows the flow of the computing process of the patch method.
FIG. 13 schematically shows the flow of the computing process of the image based method.
FIG. 14 is shown for explaining the outline of the learning method of a statistical model.
FIG. 17 is a flowchart showing an example of the procedure of a process related to the learning of an image based method model.
FIG. 18 is a flowchart showing an example of the procedure of a process for obtaining distance information from a captured image using an image based method model.
FIG. 19 schematically shows a learning method according to a first comparison example of the present embodiment.

DETAILED DESCRIPTION

In general, according to one embodiment, a learning method for causing a second statistical model for outputting a prediction value corresponding to an entire area of an image based on input of the entire area of the image to learn using a first statistical model for outputting a prediction value corresponding to a local area of the image based on input of the local area of the image is provided. The method includes obtaining a first learning image, cutting out each local area of the obtained first learning image, and obtaining a first prediction value corresponding to each local area output from the first statistical model by inputting each local area to the first statistical model and obtaining a second prediction value corresponding to an entire area of the obtained first learning image output from the second statistical model by inputting the entire area of the first learning image to the second statistical model, and causing the second statistical model to learn based on a difference between the first prediction value and the second prediction value.

Various embodiments will be described hereinafter with reference to the accompanying drawings.

Figure 1:
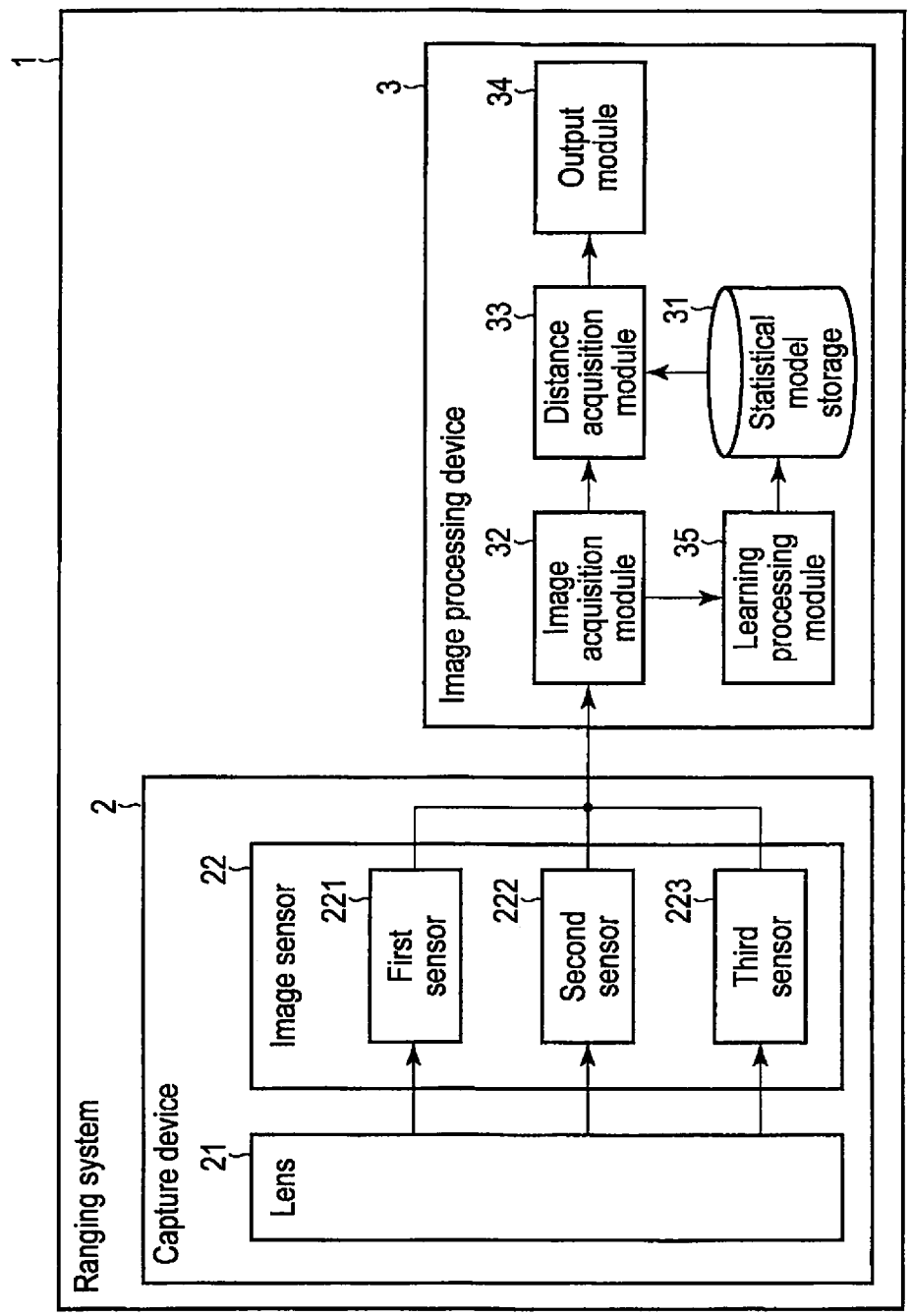
FIG. 1 shows an example of the configuration of a ranging system according to the present embodiment.

FIG. 1 shows an example of the configuration of a ranging system according to the present embodiment. The ranging system 1 shown in FIG. 1 is used to capture an image and obtain (measure) the distance from the capture point to a subject using the captured image.

As shown in FIG. 1, the ranging system 1 includes a capture device 2 and an image processing device 3. In the present embodiment, the ranging system 1 includes the capture device 2 and the image processing device 3 as separate devices. However, the ranging system 1 may be realized as a single device (ranging device) in which the capture device 2 functions as a capture unit and the image processing device 3 functions as an image processor. The image processing device 3 may operate as, for example, a server which performs various kinds of cloud computing services.

The capture device 2 is used to capture various types of images. The capture device 2 includes a lens 21 and an image sensor 22. The lens 21 and the image sensor 22 are equivalent to the optical system (monocular camera) of the capture device 2.

The light reflected on a subject enters the lens 21. The light which entered the lens 21 passes through the lens 21. The light which passed through the lens 21 reaches the image sensor 22 and is received (detected) by the image sensor 22. The image sensor 22 generates an image consisting of a plurality of pixels by converting the received light into electric signals (photoelectric conversion).

The image sensor 22 is realized by, for example, a charge coupled device (CCD) image sensor and a complementary metal oxide semiconductor (CMOS) image sensor. The image sensor 22 includes, for example, a first sensor (R sensor) 221 which detects light having a red (R) wavelength band, a second sensor (G sensor) 222 which detects light having a green (G) wavelength band and a third sensor (B sensor) 223 which detects light having a blue (B) wavelength band. The image sensor 22 is configured to receive light having corresponding wavelength bands by the first to third sensors 221 to 223 and generate sensor images (an R image, a G image and a B image) corresponding to the wavelength bands (color components). The image captured by the capture device 2 is a color image (RGB image) and includes an R image, a G image and a B image.

In the present embodiment, the image sensor 22 includes the first to third sensors 221 to 223. However, the image sensor 22 may be configured to include at least one of the first to third sensors 221 to 223. The image sensor 22 may be configured to include, for example, a sensor for generating a monochromatic image instead of the first to third sensors 221 to 223.

In the present embodiment, an image generated based on the light which passed through the lens 21 is an image affected by the aberration of the optical system (lens 21), and includes bokeh produced by the aberration.

The image processing device 3 shown in FIG. 1 includes, as functional structures, a statistical model storage 31, an image acquisition module 32, a distance acquisition module 33, an output module 34 and a learning processing module 35.

In the statistical model storage 31, a statistical model used to obtain the distance to a subject from an image captured by the capture device 2 is stored. The statistical model stored in the statistical model storage 31 is generated by learning the bokeh produced in an image affected by the above aberration of the optical system and changing nonlinearly in accordance with the distance to a subject in the image. According to the statistical model, when an image is input to the statistical model, the distance to a subject in the image can be predicted (output) as a prediction value corresponding to the image.

It should be noted that the statistical model may be generated by applying various types of known machine learning algorithm such as a neural network or random forests. The neural network applicable in the present embodiment may include, for example, a convolutional neural network (CNN), a totally-coupled neural network and a recurrent neural network.

The image acquisition module 32 obtains an image captured by the capture device 2 from the capture device 2 (image sensor 22).

The distance acquisition module 33 obtains distance information indicating the distance to a subject in the image, using an image obtained by the image acquisition module 32. In this case, the distance acquisition module 33 inputs an image to the statistical model stored in the statistical model storage 31 to obtain distance information indicating the distance to a subject in the image.

For example, the output module 34 outputs the distance information obtained by the distance acquisition module 33 in a map form in which the distance information is positionally associated with an image. In this case, the output module 34 is configured to output image data consisting of pixels in which the distance indicated by distance information is a pixel value (in other words, the output module 34 is configured to output distance information as image data). When distance information is output as image data in this manner, for example, the image data can be displayed as a distance image indicating the distance by colors. For example, the distance information output by the output module 34 may be used to calculate the size of a subject in an image captured by the capture device 2.

For example, the learning processing module 35 performs a process related to the learning of the statistical model stored in the statistical model storage 31, using an image obtained by the image acquisition module 32. The details about the process performed by the learning processing module 35 are explained later.

In the example shown in FIG. 1, the image processing device 3 includes the modules 31 to 35. However, for example, the image processing device 3 may include a ranging device including the image acquisition module 32, the distance acquisition module 33 and the output module 34, and a learning device including the statistical model storage 31 and the learning processing module 35.

FIG. 2 shows an example of the system configuration of the image processing device 3 shown in FIG. 1. The image processing device 3 includes a CPU 301, a nonvolatile memory 302, a RAM 303 and a communication device 304. The image processing device 3 further includes a bus 305 mutually connecting the CPU 301, the nonvolatile memory 302, the RAM 303 and the communication device 304.

The CPU 301 is a hardware processor to control the operation of various components of the image processing device 3. The CPU 301 may be a single processor or include a plurality of processors. The CPU 301 executes various programs loaded from the nonvolatile memory 302 into the RAM 303. These programs include an operating system (OS) and various application programs. The application programs include an image processing program 303A.

The nonvolatile memory 302 is a storage medium used as an auxiliary storage device. The RAM 303 is a storage medium used as a main storage device. FIG. 2 shows only the nonvolatile memory 302 and the RAM 303. However, the image processing device 3 may include another storage device such as a hard disk drive (HDD) or a solid storage drive (SDD).

In the present embodiment, the statistical model storage 31 shown in FIG. 1 is realized by, for example, the nonvolatile memory 302 or another storage device.

In the present embodiment, the image acquisition module 32, the distance acquisition module 33, the output module 34 and the learning processing module 35 shown in FIG. 1 are partially or entirely realized by causing the CPU 301 (in other words, the computer of the image processing device 3) to execute the image processing program 303A, in other words, by software. The image processing program 303A may be stored in a computer-readable storage medium and distributed, or may be downloaded into the image processing device 3 through a network.

This specification explains that the image processing program 303A is executed by the CPU 301. However, the modules 32 to 35 may be partially or entirely realized by using, for example, a GPU (not shown) in place of the CPU 301. The modules 32 to 35 may be partially or entirely realized by hardware such as an integrated circuit (IC) or a combination of software and hardware.

The communication device 304 is a device configured to perform wired communication or wireless communication. The communication device 304 includes a transmitter which transmits a signal and a receiver which receives a signal. For example, the communication device 304 communicates with an external device via a network and communicates with an external device present around the communication device 304. The external device includes the capture device 2. In this case, the image processing device 3 is configured to receive an image from the capture device 2 via the communication device 304.

Although omitted in FIG. 2, the image processing device 3 may further include an input device such as a mouse or keyboard, and a display device such as a display.

Now, this specification explains the outline of the operation of the ranging system 1 of the present embodiment with reference to FIG. 3.

In the ranging system 1, the capture device 2 (image sensor 22) generates an image affected by the aberration of the optical system (lens 21) as described above.

The image processing device 3 (image acquisition module 32) obtains an image generated by the capture device 2 and inputs the image to the statistical model stored in the statistical model storage 31.

The statistical model of the present embodiment outputs the distance to a subject in the image input as described above (in other words, a prediction value). In this way, the image processing device 3 (distance acquisition module 33) is configured to obtain distance information indicating the distance (the distance to the subject in the image) output from the statistical model.

In this way, in the present embodiment, distance information can be obtained from an image captured by the capture device 2 using a statistical model.

Figure 4:
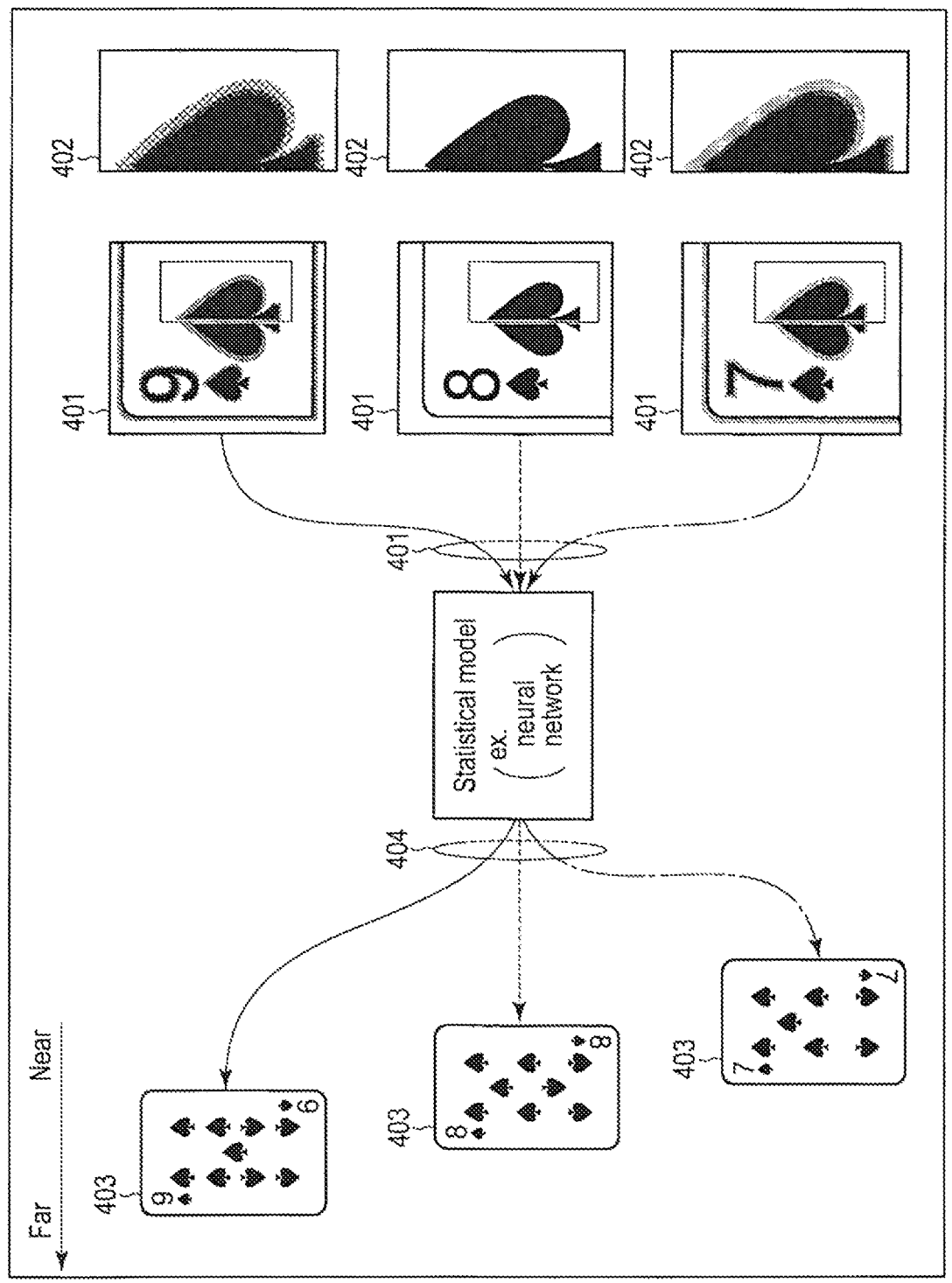
FIG. 4 is shown for explaining the principle of predicting the distance to a subject.

Now, this specification briefly explains the principle for predicting the distance to a subject in the present embodiment with reference to FIG. 4.

An image captured by the capture device 2 (hereinafter, referred to as a captured image) includes bokeh caused by the aberration of the optical system of the capture device 2 (lens aberration) as stated above. Specifically, the refractive index of light when light passes through the lens 21 having aberration differs depending on the wavelength band. Thus, for example, when the position of the subject is out of the focus position (in other words, out of the focus position in the capture device 2), light of various wavelength bands is not concentrated at one point and reaches different points. This emerges as bokeh (chromatic aberration) on an image.

In a captured image, bokeh (the color, size and shape) changing nonlinearly in accordance with the distance to the subject (in other words, the position of the subject with respect to the capture device 2) in the image is observed.

For this reason, in the present embodiment, bokeh (bokeh information) 402 produced in a captured image 401 as shown in FIG. 4 is analyzed as a physical clue related to the distance to a subject 403 in a statistical model, thereby predicting the distance 404 to the subject 403.

Now, this specification explains an example of a method for predicting the distance from a captured image in a statistical model. Here, this specification explains a patch method and an image based method.

Figure 5:
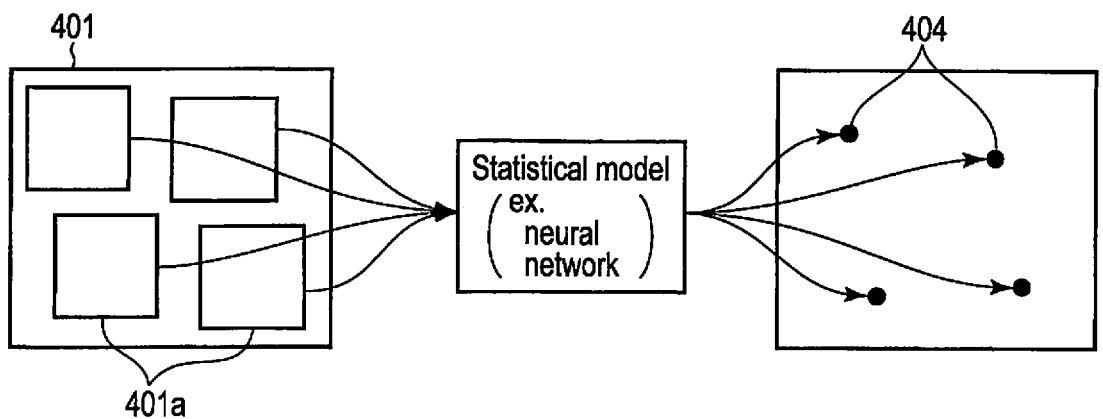
FIG. 5 is shown for explaining a patch method for predicting the distance from a captured image.

With reference to FIG. 5, the patch method is explained. In the patch method, local areas (hereinafter, referred to as image patches) 401a are cut out (extracted) from the captured image 401.

In this case, for example, the entire area of the captured image 401 may be divided into a matrix, and the partial areas after the division may be cut out in series as the image patches 401a. Alternatively, the captured image 401 may be recognized, and the image patches 401a may be cut out to cover the area in which a subject (image) is detected. An image patch 401a may partially overlap another image patch 401a.

In the patch method, each image patch 401a (specifically, information related to each image patch 401a) cut out in the above manner is input to a statistical model. A distance is output as a prediction value corresponding to the image patch 401a from the statistical model. In other words, in the patch method, each image patch 401a cut out from the captured image 401 is input, and the distance 404 to a subject included in the image patch 401a is predicted.

Figure 6:
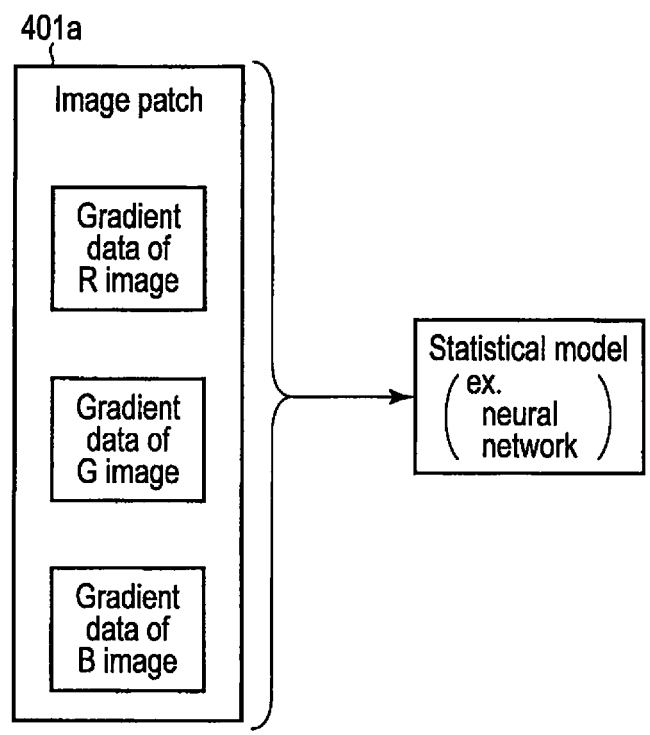
FIG. 6 shows an example of information related to an image patch.

FIG. 6 shows an example of information related to an image patch 401a input to a statistical model in the patch method.

In the patch method, the gradient data of each image patch 401a cut out from the captured image 401 with regard to each of the R image, G image and B image included in the captured image 401 (specifically, the gradient data of the R image, the gradient data of the G image and the gradient data of the B image) is generated. The gradient data generated in this manner is input to a statistical model.

The gradient data is equivalent to the difference (difference value) of the pixel value between each pixel and its adjacent pixel. For example, when each image patch 401a is extracted as a rectangular area of n pixels (X-axis direction)×m pixels (Y-axis direction), gradient data in which the difference values calculated with respect to the respective pixels included in the image patch 401a from, for example, the respective adjacent pixels on the right are arranged in a matrix shape of n rows×m columns is generated.

The statistical model uses the gradient data of an R image, the gradient data of a G image and the gradient data of a B image and predicts the distance based on the bokeh produced in each image. FIG. 6 shows a case where the gradient data of each of an R image, a G image and a B image is input to the statistical model. However, the gradient data of an RGB image may be input to the statistical model.

Figure 7:
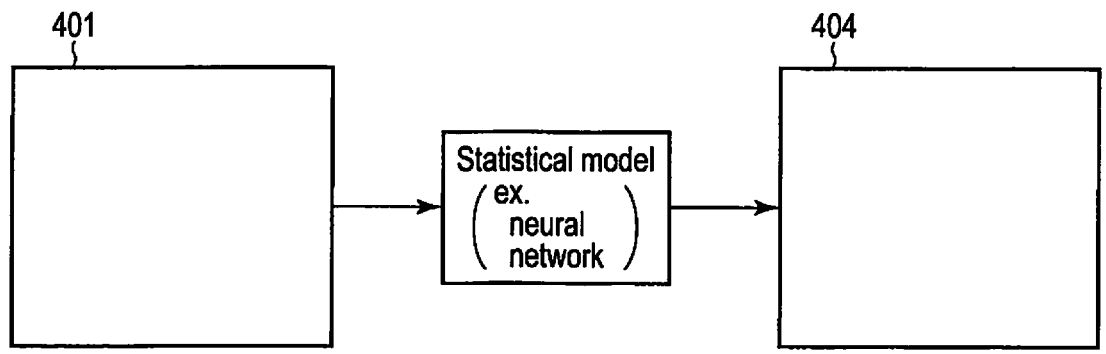
FIG. 7 is shown for explaining an image based method for predicting the distance from a captured image.

Now, this specification explains the image based method with reference to FIG. 7. In the image based method, the above process for cutting out the image patches 401a is not performed.

In the image based method, the entire area of the captured image 401 (specifically, information related to the entire area of the captured image 401) is input to a statistical model. A distance is output from the statistical model as a prediction value corresponding to the entire area. In the image based method, the entire area of the captured image 401 is input, and the distance 404 to a subject included in the entire area of the captured image 401 is predicted.

The information related to the entire area and input to the statistical model in the image based method is, for example, the above-described gradient data of an R image, a G image and a B image.

In the image based method, the entire area of the captured image 401 is input to the statistical model. Thus, the context extracted from the captured image 401 (entire area) can be used for the above prediction of the distance. The context is equivalent to a feature amount related to, for example, the line segment and color distribution in the captured image 401. The context includes the feature of a subject (for example, the shape of a person and the shape of a building).

Now, this specification explains the details of the patch method and the image based method. Firstly, the patch method is explained. When the patch method is applied, a statistical model (hereinafter, referred to as a patch method model) for outputting (predicting) a distance corresponding to an image patch (local area) of a captured image based on the input of the image patch is used.

FIG. 8 to FIG. 11 schematically show the flow of the computing process of the patch method (patch method model).

Figure 8:
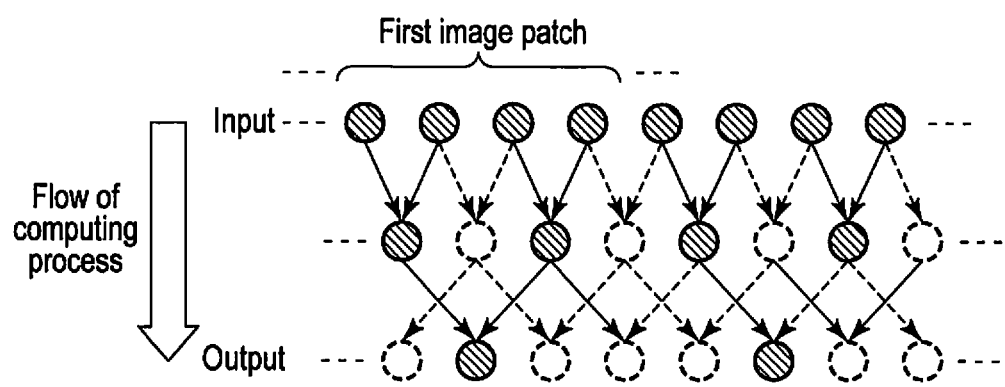
FIG. 8 schematically shows the flow of the computing process of the patch method.

In the patch method, as shown in FIG. 8, a computing process is performed based on the input of the pixel value (specifically, gradient data based on the pixel value) of each pixel included in each first image patch cut out from a captured image. In this way, a distance corresponding to each first image patch is output.

Subsequently, as shown in FIG. 9, a computing process is performed based on the input of the pixel value (specifically, gradient data based on the pixel value) of each pixel included in each second image patch cut out from the captured image. In this way, a distance corresponding to each second image patch is output. Each second image patch is an image patch partially overlapping a corresponding first image patch (in other words, the first image is slightly moved). The second image patches are not matched with the first image patches.

Similarly, as shown in FIG. 10, a computing process is performed based on the input of the pixel value (specifically, gradient data based on the pixel value) of each pixel included in each third image patch cut out from the captured image. In this way, a distance corresponding to each third image patch is output. Each third image patch is an image patch partially overlapping corresponding first and second image patches (in other words, the second image is further slightly moved). The third image patches are not matched with the first or second patches.

Furthermore, as shown in FIG. 11, a computing process is performed based on the input of the pixel value (specifically, gradient data based on the pixel value) of each pixel included in each fourth image patch cut out from the captured image. In this way, a distance corresponding to each fourth image patch is output. Each fourth image patch is an image patch partially overlapping corresponding first to third image patches (in other words, the third image is further slightly moved). The fourth image patches are not matched with the first to third patches.

In the patch method, this flow of the computing process is applied to each image patch in series, thereby outputting (computing) a distance corresponding to each image patch as shown in FIG. 12.

In the patch method, the first to fourth image patches are cut out so as to cover the captured image. Thus, a distance is output for each pixel included in the captured image based on the input of the pixel value (specifically, gradient data based on the pixel value) of each pixel included in the captured image (in other words, a distance is output with the same resolution as the input).

Secondly, this specification explains the image based method. When the image based method is applied, a statistical model (hereinafter, referred to as an image based method model) for outputting (predicting) a distance corresponding to the entire area of a captured image based on the input of the entire area as described above is used.

FIG. 13 schematically shows the flow of the computing process of the image based method (image based method model).

In the image based method, as shown in FIG. 13, the pixel value (specifically, gradient data based on the pixel value) of each pixel included in the entire area of a captured image is input. Based on this input, for example, computing processes of a convolution operation, downsampling and upsampling are performed. In this way, a distance corresponding to the entire area is output.

In the image based method, a distance is output for each pixel included in a captured image based on the input of the pixel value (specifically, gradient data based on the pixel value) of each pixel included in the captured image (in other words, a distance is output with the same resolution as the input).

In the patch method described above, a computing process needs to be applied to a large number of image patches. Thus, the amount of computation is large, and the processing load is high (in other words, the processing speed is low).

In the image based method, no image patch is cut out. The entire area of a captured image is collectively processed. Thus, in comparison with the patch method, the amount of computation is small, and the processing load is low. Moreover, in the image based method, as described above, the context (feature amount) extracted from a captured image can be used.

A massive amount of data set for learning (a set including a learning image and a correct value related to the distance to a subject in the learning image) is necessary for the learning of a statistical model. The learning of a patch method model has the advantage that an image obtained by capturing an image displayed in a display, etc., with the capture device 2 can be used as a learning image, and the distance from the capture device 2 to the display can be used as a correct value (in other words, a data set for learning in a plane may be used). Further, as the patch method does not use the above context, domain adaptation is easy. Domain adaptation is a type of transfer learning. For example, domain adaption indicates that the result of learning (knowledge) in a specific issue is applied to another issue.

In the image based method, it is necessary to prepare a data set for learning by actually capturing a subject by the capture device 2 and measuring the distances to all the subjects included in the screen from the capture image 2. In the image based method, for example, it is difficult to prepare (collect) a data set for learning every time the subject changes (in other words, the use application changes). Moreover, in the image based method, context is used as described above (in other words, the image based method relies on context). Thus, domain adaptation is difficult.

In terms of easiness of learning, the patch method has an advantage as the preparation of a data set for learning is comparatively easy. In terms of the processing load applied when the distance to a subject is estimated using a captured image, the image based method has an advantage. For example, if the time required to predict the distance in a patch method model is approximately 300 seconds, the time required to predict the distance in an image based method model is approximately 0.5 seconds.

In consideration of this matter, in the present embodiment, an image based method model is used to predict the distance to a subject using a captured image, whereas a patch method model is used for the learning of the image based method model.

Now, this specification explains the learning method of an image based method model according to the present embodiment. The outline of the learning method of a general statistical model is explained with reference to FIG. 14. When either the patch method or the image based method is used, a statistical model is caused to learn basically by inputting information related to a learning image 501 to the statistical model and feeding back the difference between the distance 502 output (predicted) by the statistical model and a correct value 503 to the statistical model as described in FIG. 14. Feeding back refers to updating the parameter (for example, the weight coefficient) of the statistical model so as to decrease the difference.

Specifically, when the patch method is applied, information (gradient data) related to each image patch (local area) cut out from the learning image 501 is input to a patch method model. The patch method model outputs the distance 502 of a pixel corresponding to each image patch. The difference obtained by comparing the distance 502 output in this way with the correct value 503 is fed back to the patch method model.

When the image based method is applied, information (gradient data) related to the entire area of the learning image 501 is collectively input to an image based method model. The image based method model outputs the distance 502 of each pixel included in the learning image 501. The difference obtained by comparing the distance 502 output in this way with the correct value 503 is fed back to the image based method model.

Figure 15:
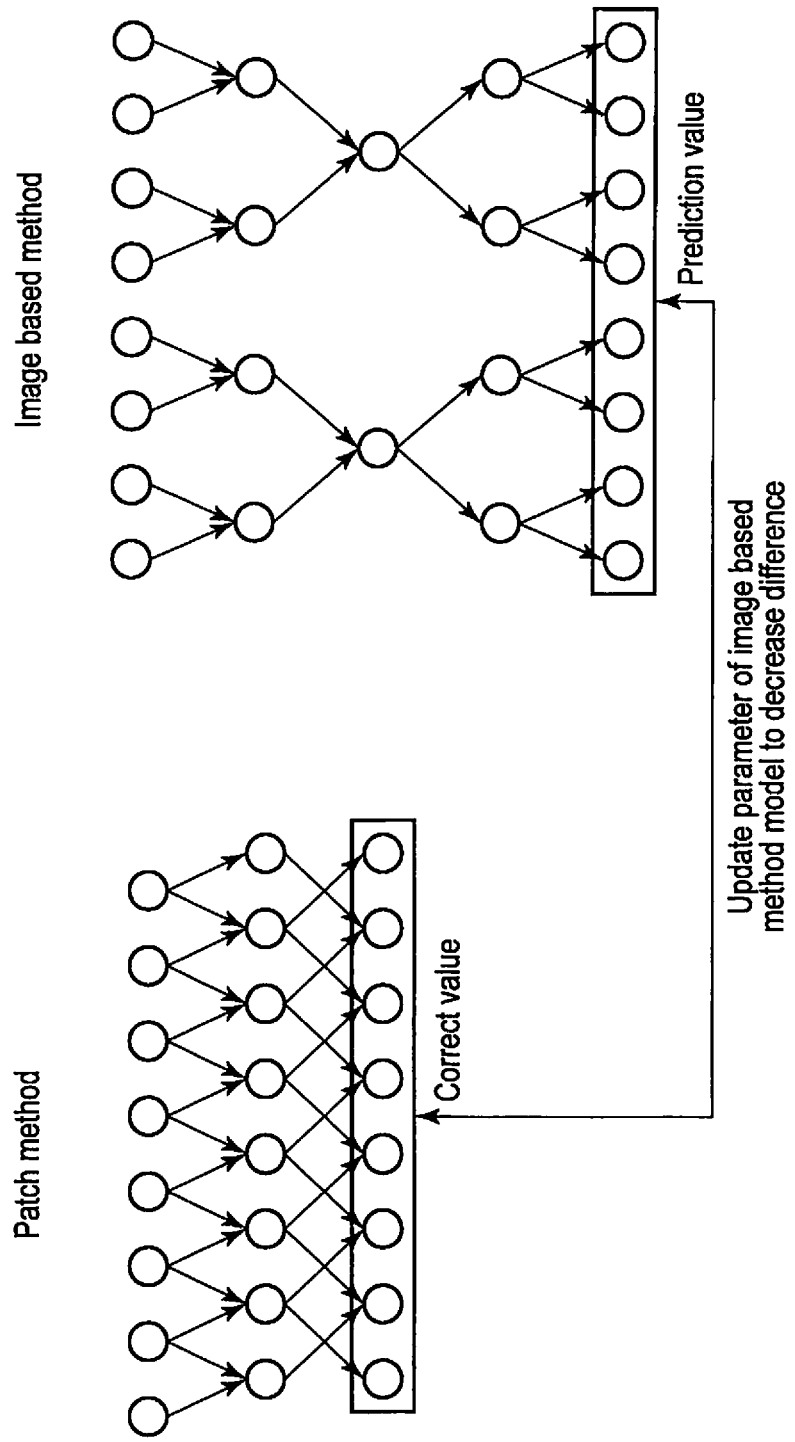
FIG. 15 is shown for explaining the outline of the learning method of an image based method model.

FIG. 15 is shown for explaining the outline of the learning method of an image based method model according to the present embodiment.

In the present embodiment, as shown in FIG. 15, an image based method model is caused to learn by using, as a correct value, the distance output from a patch method model which learned in advance in the patch method in which a sufficient amount of data set for learning can be prepared.

The image based method model is caused to learn a learning image by feeding back the difference between a prediction value output from the image based method model based on the input of the entire area of the learning image and a prediction value (correct value) output from the patch method model based on the input of each image patch of the learning image to the image based method model (in other words, by updating the parameter of the image based method model so as to decrease the difference).

According to this configuration, in the learning of the image based method model, it is unnecessary to prepare a correct value related to the distance to a subject in a learning image (in other words, a data set for learning). Thus, the easiness of the learning of the image based method model can be improved.

In the present embodiment, as described above, the patch method model is used for the learning of the image based method model. Thus, the learning of the patch method model is performed as preliminary learning (preprocessing) for the learning of the image based method model.

Figure 16:
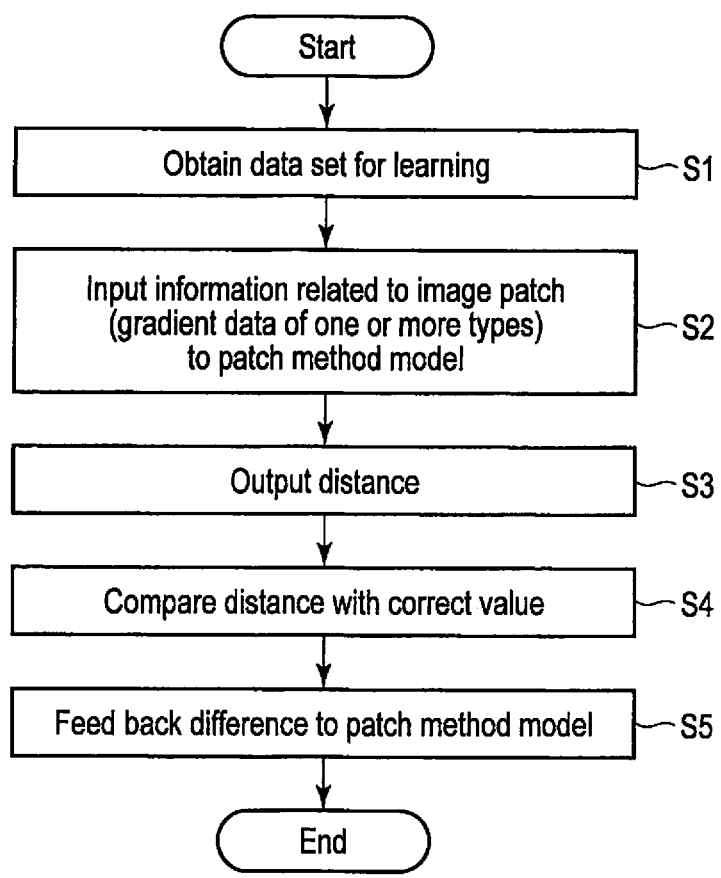
FIG. 16 is a flowchart showing an example of the procedure of a process related to the learning of a patch method model.

This specification explains an example of the procedure of a process related to the learning of a patch method model with reference to the flowchart of FIG. 16. The process shown in FIG. 16 is performed by the learning processing module 35 included in the image processing device 3.

The learning processing module 35 obtains a data set for learning prepared in advance (step S1). The data set for learning obtained in step S1 is a data set for learning which is used for the learning of a patch method model and which can be comparatively more easily prepared than a data set for learning used for the learning of an image based method model as described above. The data set includes a learning image and a correct value. For example, the data set for learning may be retained inside the image processing device 3 or may be obtained from the outside of the image processing device 3.

Subsequently, the learning processing module 35 cuts out an image patch from a learning image (hereinafter, referred to as a patch method learning image) included in the data set for learning obtained in step S1, and inputs information related to the image patch to a patch method model (step S2). The patch method learning image is, for example, generated by the image sensor 22 based on the light which passed through the lens 21 provided in the capture device 2, and is affected by the aberration of the optical system (lens 21) of the capture device 2. Thus, the patch method learning image includes bokeh which changes nonlinearly in accordance with the distance to the subject.

In step S2, as the information related to the image patch, for example, the gradient data of an R image, a G image and a B image is input to the patch method model.

In the present embodiment, this specification explains that the gradient data of an R image, a G image and a B image is input to the patch method model. However, when a patch method model which outputs a distance in terms of the shape of the bokeh produced in a patch method learning image (image patch) as described above is generated, the gradient data of at least one of an R image, a G image and a B image should be input to the patch method model. When a patch method model which outputs a distance in terms of the color and size of the bokeh produced in a patch learning image (image patch) by chromatic aberration is generated, the gradient data of at least two of an R image, a G image and a B image should be input to the patch method model. An RGB image itself may be input to the patch method model instead of gradient.

After the process of step S2, the distance to a subject is output from the patch method model (step S3). In this case, the patch method model extracts bokeh produced in the image patch from the image patch, and outputs a distance corresponding to the bokeh.

Subsequently, the learning processing module 35 compares the distance output from the patch method model in step S3 with the correct value included in the data set for learning obtained in step S1 (step S4).

After the process of step S4, the learning processing module 35 feeds back the result of comparison (difference) in step S4 to the patch method model (step S5). In this manner, in the patch method model, the parameter is updated so as to decrease the difference (in other words, the bokeh produced in the image patch is learned).

The process of steps S2 to S5 is performed for each image patch cut out from the patch method learning image.

By repeating the process shown in FIG. 16 for each patch method learning image (each data set for learning), a patch method model which learned bokeh changing nonlinearly in accordance with the distance to a subject in each patch method learning image is generated. The patch method model generated in this manner is stored in the statistical model storage 31 included in the image processing device 3.

Here, this specification explains that the process shown in FIG. 16 is performed by the learning processing module 35. However, the process shown in FIG. 16 may be performed outside the image processing device 3. In other words, the patch method model generated by performing the process of FIG. 16 outside the image processing device 3 may be stored in the statistical storage 31.

Now, this specification explains an example of the procedure of a process related to the learning of an image based method model with reference to the flowchart of FIG. 17. The process shown in FIG. 17 is performed by the learning processing module 35 included in the image processing device 3 in a manner similar to that of the process of FIG. 16.

The learning processing module 35 obtains, for example, an image captured by the capture device 2 as a learning image (step S11). The learning image obtained in step S1 is an image used for the leaning of an image based method model. The learning image includes bokeh which changes nonlinearly in accordance with the distance to a subject.

Subsequently, the learning processing module 35 cuts out an image patch from the learning image (hereinafter, referred to as an image based method learning image) obtained in step S11, and inputs information related to the image patch to a patch method model (the patch method model generated by performing the process shown in FIG. 15) (step S12).

In step S12, as the information related to the image patch, for example, the gradient data of an R image, a G image and a B image is input to the patch method model. To the patch method model, the gradient data of at least one of an R image, a G image and a B image may be input. In step S12, gradient data corresponding to the gradient data input to the patch method model in step S2 shown in FIG. 16 is input. When the gradient data of an R image, a G image and a B image is input to the patch method model in step S2 shown in FIG. 16, similarly, the gradient data of an R image, a G image and a B image is input to the patch method model in step S12. When the gradient data of an R image is input to the patch method model in step S2 shown in FIG. 16, similarly, the gradient data of an R image is input to the patch method model in step S12. An RGB image itself may be input to the patch method model instead of gradient.

After the process of step S12, the distance to a subject (hereinafter, referred to as a first distance) is output from the patch method model (step S13). In this case, the patch method model extracts bokeh produced in the image patch from the image patch, and outputs a first distance corresponding to the bokeh.

The process of steps S12 and S13 is performed for each image patch cut out from the image based method learning image. Thus, the learning processing module 35 obtains a first distance corresponding to each image patch output from the patch method model. The first distance corresponding to each image patch includes the distance for each pixel included in the image based method learning image.

Subsequently, the learning processing module 35 inputs information related to the image based method learning image (specifically, the entire area) to the image based method model (step S14).

In step S14, as the information related to the image based method learning image, for example, the gradient data of an R image, a G image and a B image for the entire area of the image based method learning image is input to the image based method model. In a manner similar to that of the patch method model, the gradient data of at least one of an R image, a G image and a B image may be input to the image based method model. An RGB image itself may be input to the image based method model instead of gradient.

After the process of step S14, the distance to a subject (hereinafter, referred to as a second distance) is output from the image based method model (step S15). In this case, the image based method model extracts bokeh produced in the image based method learning image from the image based method learning image and outputs a second distance corresponding to the bokeh.

Thus, the learning processing module 35 obtains a second distance corresponding to the entire area of the image based method learning image output from the image based method model. The second distance corresponding to the entire area of the image based method learning image includes the distance for each pixel included in the image based method learning image.

Here, in the learning of the image based method model in the present embodiment, the first distance obtained by the learning processing module 35 (in other words, the first distance output from the patch method model) is used as a correct value included in a data set for learning.

The learning processing module 35 compares the second distance (the prediction value by the image based method model) with the first distance (the correct value by the patch method model) (step S16). In step S16, for each pixel, the second distance output from the image based method model is compared with the first distance output from the patch method model. In other words, in step S16, the second distance and the first distance corresponding to the same position on the learning image are compared with each other.

After the process of step S16, the learning processing module 35 feeds back the result of comparison (difference) in step S16 to the image based method model (step S17). In this way, in the image based method model, the parameter is updated so as to decrease the difference (in other words, the image based method model learns the bokeh produced in the image based method learning image based on the difference).

By repeating the process shown in FIG. 17 for each image based method learning image, an image based method model which learned bokeh changing nonlinearly in accordance with the distance to a subject in the image based method learning image is generated. The image based method model generated in this manner is stored in the statistical model storage 31 included in the image processing device 3.

Now, this specification explains an example of the procedure of a process for obtaining distance information from a captured image using an image based method model which learned bokeh by performing the process shown in FIG. 17 with reference to the flowchart of FIG. 18.

The capture device 2 (image sensor 22) captures a subject and generates a captured image including the subject. The captured image is affected by the aberration of the optical system (lens 21) of the capture device 2 as described above.

The image acquisition module 32 included in the image processing device 3 obtains the captured image from the capture device 2 (step S21).

Subsequently, the distance acquisition module 33 inputs information related to the captured image obtained in step S21 to the image based method model stored in the statistical model storage 31 (the image based method model which learned by performing the process shown in FIG. 17) (step S22). The process of step S22 is similar to that of step S14 shown in the above FIG. 17. Therefore, the detailed explanation thereof is omitted here.

After the process of step S22, the distance to a subject is predicted in the image based method model. The image based method model outputs the predicted distance. In this way, the distance acquisition module 33 obtains distance information indicating the distance output from the image based method model (step S23). The distance information obtained in step S23 includes the distance for each pixel included in the captured image obtained in step S21.

After the process of step S23, for example, the output module 34 outputs the distance information obtained in step S23 in a map form in which the distance information is associated with the captured image in terms of the location (step S24). In the present embodiment, this specification mainly explains that the distance information is output in a map form. However, the distance information may be output in another form.

As described above, in the present embodiment, each image patch (local area) of an image based method learning image (a first leaning image) is cut out. Each local area is input to a patch method model (a first statistical model). In this way, a first distance (a first prediction value) corresponding to each image patch output from the patch method model is obtained. The entire area of an image based method learning image is input to an image based method model (a second statistical model). In this way, a second distance (a second prediction value) corresponding to the entire area of the image based method learning image output from the image based method model is obtained. The image based method model learns based on the difference between the first distance and the second distance.

In the present embodiment, in the learning of the image based method model, it is unnecessary to prepare a data set for learning (in other words, a set including a learning image and a correct value related to the distance to a subject in the learning image). The first distance output from the patch method model is used as the correct value. Thus, the easiness of the learning of the image based method model can be improved.

Now, this specification explains the difference between the learning method of an image based method model in the present embodiment and comparison examples of the present embodiment.

FIG. 19 schematically shows a first comparison example of the present embodiment. As shown in FIG. 19, in the first comparison example of the present embodiment, an image patch is input to a patch method model as preliminary learning. The prediction value output from the patch method model is compared with a correct value (in other words, the difference is fed back). In this way, the patch method model is caused to learn. Further, in the first comparison example of the present embodiment, at least part of the patch method model which learned by the above preliminary learning is transferred to an image based method model. The transfer indicates that the knowledge learned in a statistical model (for example, a patch method model) is reproduced in another statistical model (for example, an image based method model). For example, the transfer indicates that the parameter of a statistical model is shared with another statistical model.

In the first comparison example of the present embodiment, a patch method model generated in preliminary learning is used for the learning of an image based method model. Thus, learning can be effectively performed.

However, in the first comparison example of the present embodiment, an image based method learning image and a correct value (in other words, a data set for learning in the image based method) are necessary for the learning of the image based method model shown in the lower part of FIG. 19. Thus, the difficulty in preparing a data set for learning cannot be overcome.

In connection with the first comparison example of the present embodiment, for example, there is a learning method called transfer learning for transferring a patch method model which learned by a large-scale data set for learning to a patch method model used in another field. There is a learning method called distillation learning in which the purpose is to cause a small patch method model (student model) to inherit knowledge from a large patch method model (teacher model).

Figure 21:
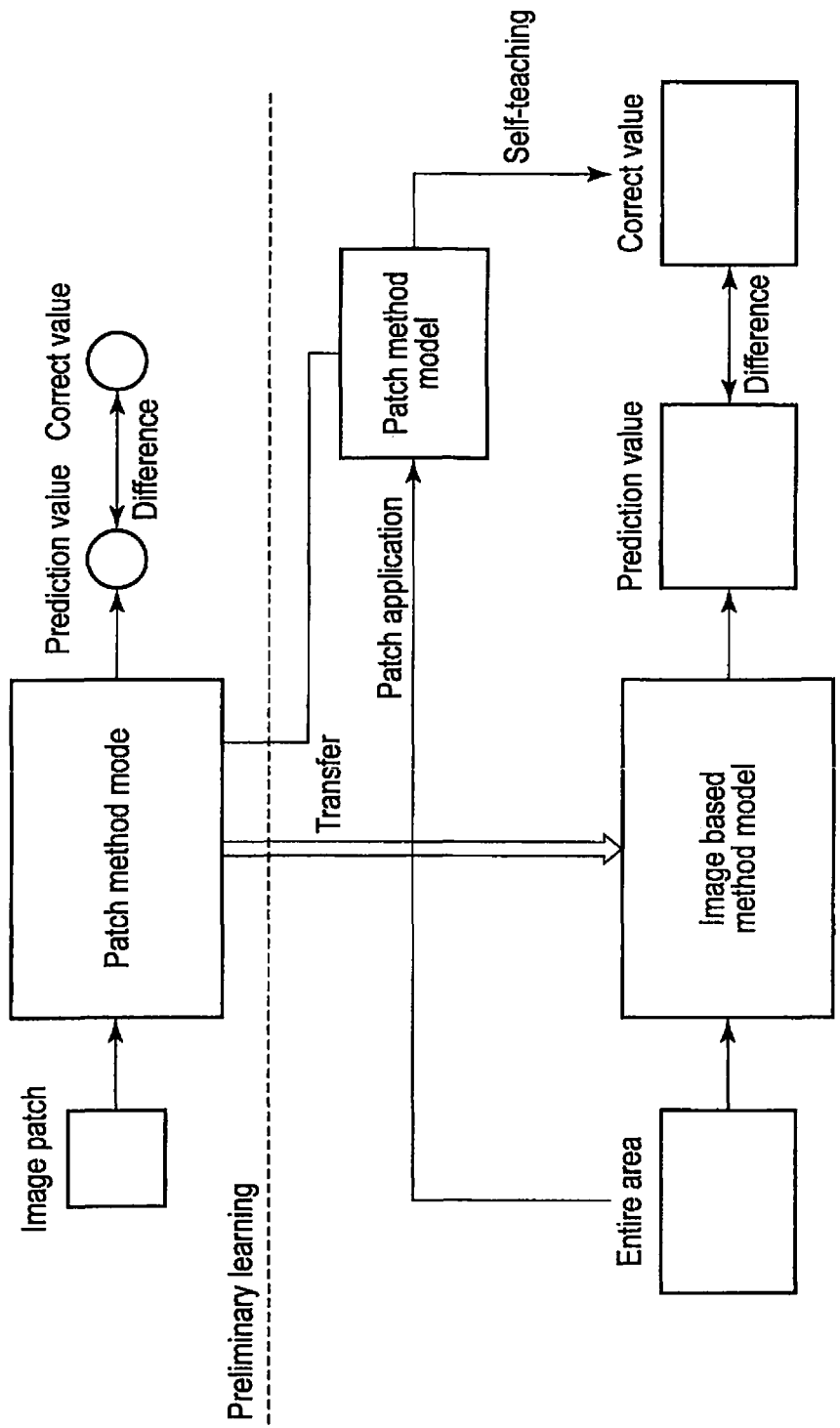
FIG. 21 schematically shows a learning method according to the present embodiment.

In the present embodiment, as shown in FIG. 21, a patch method model is generated by preliminary learning. At the time of the learning (main learning) of an image based method model, a prediction value output from the image based method model by inputting a learning image (entire area) to the image based method model is compared with a prediction value (correct value) output from the path method model by inputting the learning image (specifically, an image patch cut out from the learning image) to the patch method model. In this way, the image based method model learns based on the difference. The present embodiment realizes self-teaching for causing the image based method model to learn without manually preparing a correct value, by using the patch method model generated by preliminary learning.

Since the present embodiment comprises this configuration, in comparison with the first comparison example of the present embodiment, it is unnecessary to prepare a data set for learning in the image based method (a set including a learning image and a correct value). Thus, the easiness of the learning of the image based method model can be improved.

Figure 20:
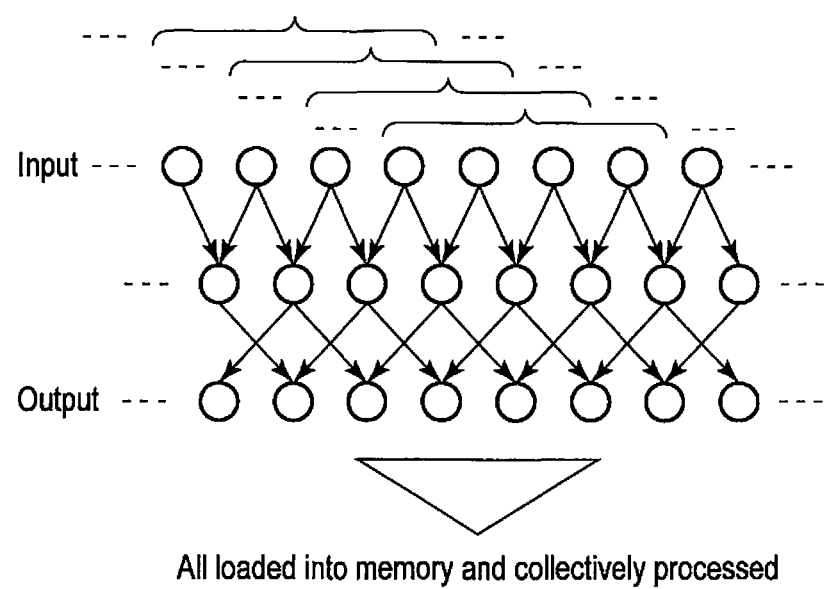
FIG. 20 schematically shows a learning method according to a second comparison example of the present embodiment.

FIG. 20 schematically shows a second comparison example of the present embodiment. When the patch method is applied, as explained in FIG. 8 to FIG. 11, the processing speed is low. However, for example, as shown in FIG. 20, if the computing process related to all the image patches is loaded into a memory, and the CPU (or GPU) collectively performs the process, the redundancy of the patch method can be parallelly computed. In this way, the processing speed may be increased.

However, in the second comparison example of the present embodiment, a large amount of memory is necessary for the parallelization of redundancy. Thus, the practicability is low.

In the present embodiment, a distance (prediction value) is obtained using an image based method model, and thus, a large amount of memory is unnecessary. The present embodiment easily realizes an increase in the processing speed in comparison with the second comparison example of the present embodiment.

FIG. 21 schematically shows a learning method according to the present embodiment. As shown in FIG. 21, a part of the patch method model generated by preliminary learning may be shared with the image based method model (in other words, the patch method model may be transferred to the image based method model). According to this configuration, for example, learning can be performed such that the portion (parameter) transferred from the patch method model to the image based method model is fixed, and only the other portion (parameter) is changed. In comparison with the case where learning is performed in the entire image based method model, the efficiency of learning can be improved. It should be noted that the image based method model may be generated, for example, without transferring the patch method model.

Figure 22:
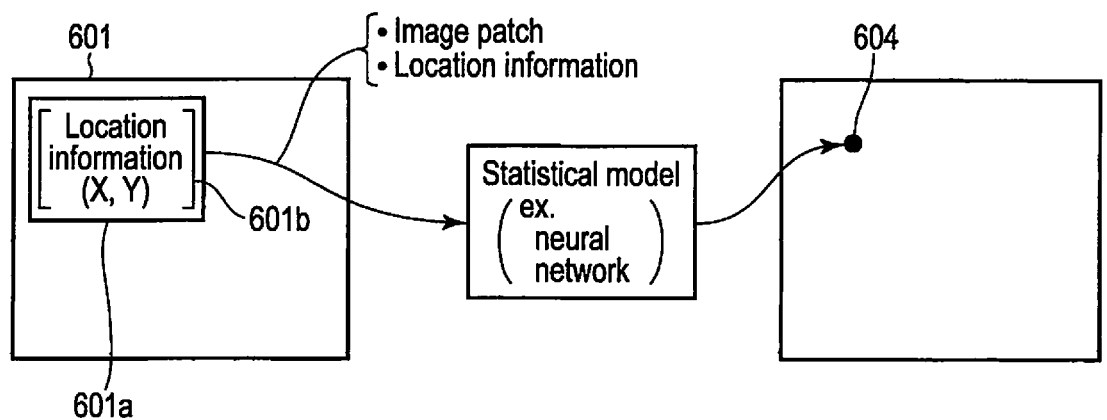
FIG. 22 is shown for explaining the configuration in which location information is input to a patch method model.

In the present embodiment, this specification explains that, as information related to an image patch of a learning image, the gradient data of the image patch is input to a patch method model. However, as shown in FIG. 22, as information related to an image patch 601a of a learning image 601, the gradient data of the image patch 601a and location information 601b (an X-coordinate and a Y-coordinate) indicating the location of the image patch 601a on the learning image 601 may be input to the patch method model.

For example, the location information 601b may indicate the center point of the image patch 601a, or a predetermined side such as an upper left side. As the location information 601b, the location information of each pixel included in the image patch 601a on the learning image 601 may be used.

By further inputting the location information 601*b* to the patch method model as described above, for example, when the bokeh of the subject image formed by the light passing through the middle portion of the lens 21 is different from the bokeh of the subject image formed by the light passing through the end portion of the lens 21, the effect caused by the difference to the prediction of the distance can be eliminated.

In the patch method using location information as described above, the distance can be predicted with higher accuracy based on the correlation of bokeh, the distance and the location on an image.

In the above description, the patch method is explained. However, the same explanation is applied to the image based method. As information related to the entire area of a learning image, the gradient data of the entire area of the learning image and location information indicating the location on the learning image may be input to the image based method model, thereby predicting (outputting) the distance based on the location of each pixel included in the learning image in the image based method model. Thus, the distance can be predicted with higher accuracy.

Further, in the present embodiment, a patch method model learns using a patch method learning image (preliminary learning), and an image based method model learns using an image based method learning image (main learning). In this respect, the patch method learning image and the image based method learning image are captured by a capture device (for example, the capture device 2) including the same optical method.

According to this configuration, location information defined as the same coordinate system can be used in a patch method learning image in preliminary learning and an image based method learning image in main learning (in other words, preliminary learning is performed using the location coordinates used in main leaning). Thus, the accuracy of a prediction value (correct value) in the patch method model used in main learning can be improved. The efficiency of learning can be further improved in connection with the improvement of the accuracy.

In the present embodiment, a patch method model predicts (outputs) the distance to a subject included in each image patch of a learning image, and an image based method model predicts (outputs) the distance to a subject included in the entire area of the learning image (in other words, the image processing device 3 is used to obtain the distance to a subject). However, the present embodiment may be realized as long as it performs the main learning of the second statistical model (for example, an image based method model), using the first statistical model (for example, a patch method model) which learned in advance as described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning method for causing a second statistical model for outputting a prediction value corresponding to an entire area of an image based on input of the entire area of the image to learn using a first statistical model for outputting a prediction value corresponding to a local area of the image based on input of the local area of the image, the method comprising:
obtaining a first learning image;
cutting out each local area of the obtained first learning image, and obtaining a first prediction value corresponding to each local area output from the first statistical model by inputting each local area to the first statistical model;
obtaining a second prediction value corresponding to an entire area of the obtained first learning image output from the second statistical model by inputting the entire area of the first learning image to the second statistical model; and
causing the second statistical model to learn based on a difference between the first prediction value and the second prediction value.

2. The learning method of claim 1, wherein
the obtaining the first prediction value includes obtaining the first prediction value corresponding to a location of each local area of the obtained first learning image on the first learning image by inputting location information indicating the location of each local area of the first learning image to the first statistical model, and
the obtaining the second prediction value includes obtaining the second prediction value corresponding to each location on the obtained first learning image by inputting location information indicating each location on the first learning image to the second statistical model.

3. The learning method of claim 2, further comprising:
obtaining a second learning image and a correct value to be output as a prediction value corresponding to each local area of the second learning image; and
generating the first statistical model based on the obtained second learning image, the obtained correct value, and location information indicating the location of each local area of the second learning image on the second learning image, wherein
the location information indicating each location on the first learning image and the location information indicating each location on the second learning image are defined as a same coordinate system.

4. The learning method of claim 1, wherein
a part of the first statistical model is shared with the second statistical model.

5. The learning method of claim 1, wherein
the first prediction value includes a distance to a subject included in each local area of the obtained learning image, and
the second prediction value includes a distance to a subject included in the entire area of the obtained learning image.

6. A non-transitory computer-readable storage medium having stored thereon a computer program which is executable by a computer and causes a second statistical model for outputting a prediction value corresponding to an entire area of an image based on input of the entire area of the image to learn using a first statistical model for outputting a prediction value corresponding to a local area of the image based on input of the local area of the image, the computer program comprising instructions capable of causing the computer to execute functions of:
obtaining a first learning image;
cutting out each local area of the obtained first learning image, and obtaining a first prediction value corresponding to each local area output from the first statistical model by inputting each local area to the first statistical model;

obtaining a second prediction value corresponding to an entire area of the obtained first learning image output from the second statistical model by inputting the entire area of the first learning image to the second statistical model; and causing the second statistical model to learn based on a difference between the first prediction value and the second prediction value.

7. The storage medium of claim 6, wherein the obtaining the first prediction value includes obtaining the first prediction value corresponding to a location of each local area of the obtained first learning image on the first learning image by inputting location information indicating the location of each local area of the first learning image on the first learning image to the first statistical model, and the obtaining the second prediction value includes obtaining the second prediction value corresponding to each location on the obtained first learning image by inputting location information indicating each location on the first learning image to the second statistical model.

8. The storage medium of claim 7, further comprising instructions capable of causing the computer to execute functions of:

obtaining a second learning image and a correct value to be output as a prediction value corresponding to each local area of the second learning image; and generating the first statistical model based on the obtained second learning image, the obtained correct value and location information indicating a location of each local area of the second learning image on the second learning image, wherein the location information indicating each location on the first learning image and the location information indicating each location on the second learning image are defined as a same coordinate system.

9. The storage medium of claim 6, wherein a part of the first statistical model is shared with the second statistical model.

10. The storage medium of claim 6, wherein the first prediction value includes a distance to a subject included in each local area of the obtained learning image, and the second prediction value includes a distance to a subject included in the entire area of the obtained learning image.

11. An image processing device for causing a second statistical model for outputting a prediction value corresponding to an entire area of an image based on input of the entire area of the image to learn using a first statistical model for outputting a prediction value corresponding to a local area of the image based on input of the local area of the image, the device comprising:

a hardware processor is configured to:

obtain a first learning image;

cut out each local area of the obtained first learning image and obtains a first prediction value corresponding to each local area output from the first statistical model by inputting each local area to the first statistical model;

obtain a second prediction value corresponding to an entire area of the obtained first learning image output from the second statistical model by inputting the entire area of the first learning image to the second statistical model; and cause the second statistical model to learn based on a difference between the first prediction value and the second prediction value.

12. The image processing device of claim 11, wherein the hardware processor is configured to:

obtain a first prediction value corresponding to a location of each local area of the obtained first learning image on the first learning image by inputting location information indicating the location of each local area of the first learning image on the first learning image to the first statistical model, and obtain a second prediction value corresponding to each location on the obtained first learning image by inputting location information indicating each location on the first learning image to the second statistical model.

13. The image processing device of claim 12, wherein the hardware processor is configured to:

obtain a second learning image, and a correct value to be output as a prediction value corresponding to each local area of the second learning image; and generate the first statistical model based on the obtained second learning image, the obtained correct value, and location information indicating a location of each local area of the second learning image on the second learning image, and the location information indicating each location on the first learning image and the location information indicating each location on the second learning image are defined as a same coordinate system.

14. The image processing device of claim 11, wherein a part of the first statistical model is shared with the second statistical model.

15. The image processing device of claim 11, wherein the first prediction value includes a distance to a subject included in each local area of the obtained learning image, and the second prediction value includes a distance to a subject included in the entire area of the obtained learning image.

* * * * *